(12) United States Patent
Wu et al.

(10) Patent No.: US 11,546,310 B2
(45) Date of Patent: Jan. 3, 2023

(54) APPARATUS, METHODS AND ARTICLES OF MANUFACTURE FOR MESSAGING USING MESSAGE LEVEL SECURITY

(71) Applicant: Sensus Spectrum, LLC, Morrisville, NC (US)

(72) Inventors: Yifan Wu, Cary, NC (US); Ricky West, Raleigh, NC (US)

(73) Assignee: Sensus Spectrum, LLC, Morrisville, NC (US)

( * ) Notice: Subject to any disclaimer, the term of this patent is extended or adjusted under 35 U.S.C. 154(b) by 90 days.

(21) Appl. No.: 15/881,151

(22) Filed: Jan. 26, 2018

(65) Prior Publication Data
US 2019/0238518 A1    Aug. 1, 2019

(51) Int. Cl.
*H04L 9/40*      (2022.01)
*H04L 9/32*      (2006.01)
*G06F 8/65*      (2018.01)

(52) U.S. Cl.
CPC ........ *H04L 63/0442* (2013.01); *H04L 9/3268* (2013.01); *H04L 63/0428* (2013.01);
(Continued)

(58) Field of Classification Search
CPC ............. H04L 63/0442; H04L 63/0428; H04L 63/0823; H04L 63/083; H04L 63/166; H04L 63/18; H04L 9/3268; G06F 8/65
See application file for complete search history.

(56) References Cited

U.S. PATENT DOCUMENTS 8,341,718 B2 * 12/2012 Chow ................... H04L 9/3213
                                                    726/10
9,294,288 B2 *  3/2016 Lund ................... H04L 63/0823
(Continued)

FOREIGN PATENT DOCUMENTS

CN       1906886 A       1/2007
CN     104115465 A      10/2014
DE   102017211267 A1 *   1/2019

OTHER PUBLICATIONS

R. E. Navas, M. Lagos, L. Toutain and K. Vijayasankar, "Nonce-based authenticated key establishment over OAuth 2.0 IoT proof-of-possession architecture," 2016 IEEE 3rd World Forum on Internet of Things (WF-IoT), 2016, pp. 317-322, doi: 10.1109/WF-IoT.2016.7845424. (Year: 2016).*
(Continued)

*Primary Examiner* — Michael Simitoski
(74) *Attorney, Agent, or Firm* — Stanek Lemon Crouse & Meeks, P.A.

(57) ABSTRACT

Methods include establishing a transport layer security connection between the client and a server that provides the web service, identifying at least one cryptographic key for communication with the web service in the connection, closing the connection and communicating between the client and the web service using a web service token that is signed and encrypted according to the identified at least one cryptographic key. Communicating between the client and the web service using a web service token may not require creation of a new transport layer security connection. Further embodiments provide a computer configured to perform operations as described above and computer-readable medium storing instructions that, when executed by a computer, perform operations as described above.

15 Claims, 6 Drawing Sheets

(52) U.S. Cl.
CPC ........ *H04L 63/083* (2013.01); *H04L 63/0823* (2013.01); *H04L 63/166* (2013.01); *H04L 63/18* (2013.01); *G06F 8/65* (2013.01)

(56) References Cited

U.S. PATENT DOCUMENTS

| | | | | |
|---|---|---|---|---|
| 9,398,003 | B2* | 7/2016 | von Krogh | H04L 9/0863 |
| 9,858,781 | B1 | 1/2018 | Campero et al. | |
| 2008/0104401 | A1* | 5/2008 | Miyamoto | H04L 63/0442 |
| | | | | 713/175 |
| 2009/0235069 | A1* | 9/2009 | Sonnega | H04L 63/067 |
| | | | | 713/156 |
| 2010/0217975 | A1* | 8/2010 | Grajek | G06F 21/445 |
| | | | | 713/157 |
| 2010/0306547 | A1* | 12/2010 | Fallows | G06F 21/31 |
| | | | | 713/178 |
| 2011/0213956 | A1* | 9/2011 | Mukkara | H04L 63/20 |
| | | | | 713/152 |
| 2013/0191884 | A1* | 7/2013 | Leicher | H04L 63/08 |
| | | | | 726/4 |
| 2014/0215213 | A1 | 7/2014 | Lund et al. | |
| 2014/0359295 | A1 | 12/2014 | Saif et al. | |
| 2015/0074407 | A1* | 3/2015 | Palmeri | H04L 67/1095 |
| | | | | 713/171 |

OTHER PUBLICATIONS

Notification of Transmittal of the International Search Report and the Written Opinion of the International Searching Authority, or the Declaration, PCT/US2019/0136552, dated Mar. 14, 2019, 11 pages.
International Preliminary Report on Patentability; PCT/US2019/0136552, dated Jul. 28, 2020, 6 pages.
IN Examination Report for PCT/US2019/013652, dated May 11, 2022, 7 pages.
European Examination Report for PCT/US2019/013652, dated May 27, 2022, 2 pages.
AU Examination Report for PCT/US2019/013652, dated Jul. 14, 2022, 3 pages.
Office Action issued by the Chinese Patent Office dated Jul. 20, 2022, in Chinese Application No. 2019800100551. A copy of the English translation and original Chinese version of said Office Action is attached hereto.

* cited by examiner

APPARATUS, METHODS AND ARTICLES OF MANUFACTURE FOR MESSAGING USING MESSAGE LEVEL SECURITY

BACKGROUND

The inventive subject matter relates to computer networking methods, apparatus and articles of manufacture and, more particularly, to methods, apparatus and articles of manufacture for secure communication in computer networks.

Networking applications generally involve the communication of messages between a sending node and a receiving node via various other intermediate nodes. Because of the need to communicate via these intermediate nodes, such communications can be vulnerable to interception, spoofing and other forms of attack. For example, such communications can be vulnerable to so-called "man in the middle" (MITM) attacks in which an attacker intercepts messages from the parties at an intermediate node and alters communications between parties by masquerading as one of the parties.

Conventional techniques for securing against MITM attacks typically employ some type of authentication to establish a secure channel between parties and using the secure channel to establish one or more cryptographic keys to be used to secure subsequent communications between the parties. For example, transport layer security (TLS) (and its predecessor, secure sockets layer (SSL)), typically involves initiating a session using a handshake protocol that establishes a symmetric key for communication between the parties during the session. The handshake typically involves an exchange of one or more security certificates, verification of the exchanged certificate(s) by a certificate authority, and establishment of a symmetric key in response to the verification of the certificate(s). For the remainder of the TLS (or SSL) session, the symmetric key is used to encrypt messages between the parties.

SUMMARY

Some embodiments of the inventive subject matter provide methods of operating a client. The methods include establishing a transport layer security connection with a server that provides a web service, identifying at least one cryptographic key for communication with the web service in the connection, closing the connection, and communicating with the web service using a web service token that is signed and encrypted according to the identified at least one cryptographic key. In some embodiments, the communication with the web service using the web service token does not require creation of a new transport layer security connection.

According to some embodiments, identifying at least one cryptographic key may include identifying a client private key and a server public key and communicating with the server using the signed web service token may include transmitting a web service token signed according to the client private key and encrypted according to the server public key. According to further embodiments, identifying at least one cryptographic key may include identifying a client public key and server private key and wherein communicating with the server using the signed web service token comprises receiving a web service token signed according to a server private key and encrypted according to a client public key.

In some embodiments, identifying at least one cryptographic key for a web service in the connection may include transmitting a credential, receiving a first web service token for the web service corresponding to the credential, exchanging security certificates with the web service using the first web service token to identify the at least one cryptographic key. Communicating with the web service using a web service token may include communicating with a second web service token that is signed and encrypted according to the identified at least one cryptographic key.

In some embodiments, the web service token may include a signed and encrypted JavaScript Object Notation (JSON) web service token (JWT). The JWT may use a JSON web signing (JWS) format and a JSON web encryption (JWE) format.

Further embodiments provide a computer configured to perform client operations as described above. Additional embodiments include computer-readable medium storing instructions that, when executed by a computer, perform client operations as described above.

Some embodiments of the inventive subject matter provide methods of operating a web service. The methods include establishing a transport layer security connection with a client, identifying at least one cryptographic key for communication with a web service hosted by the server in the connection, closing the connection, and communicating with the client using a web service token that is signed and encrypted according to the identified at least one cryptographic key. The communication with the client using the web service token may not require creation of a new transport layer security connection.

In some embodiments, identifying at least one cryptographic key may include identifying a server public key and a client private key and communicating with the server using the web service token may include receiving a web service token signed according to a client private key and encrypted according to the server public key. In further embodiments, identifying at least one cryptographic key may include identifying a server private key and a client public key and communicating with the server using the signed web service token may include transmitting a web service token signed according to the server private key and encrypted according to the client public key.

According to some embodiments, identifying at least one cryptographic key for a web service in the connection may include receiving a credential, transmitting a first web service token for the web service corresponding to the credential, and exchanging security certificates with the client using the first web service token to identify the at least one cryptographic key. Communicating with the client using a web service token may include communicating with a second web service token that is signed and encrypted according to the identified at least one cryptographic key.

Still further embodiments of the inventive subject matter provide methods of communicating between a client and a web service. The methods include establishing a transport layer security connection between the client and a server that provides the web service, identifying at least one cryptographic key for communication with the web service in the connection, closing the connection and communicating between the client and the web service using a web service token that is signed and encrypted according to the identified at least one cryptographic key. Communicating between the client and the web service using a web service token may not require creation of a new transport layer security connection.

Further embodiments provide a computer configured to perform web service operations as described above. Additional embodiments provide computer-readable medium storing instructions that, when executed by a computer, perform web service operations as described above.

DETAILED DESCRIPTION

Figure 1:
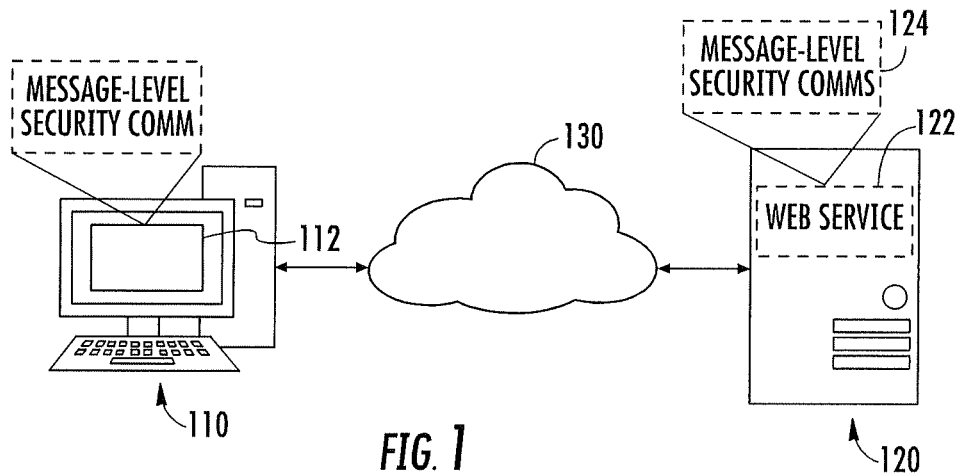
FIG. 1 is a schematic diagram illustrating a network environment in which the inventive subject matter may be applied.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter arise from a realization that reduced overhead and potentially increased resistance to MITM and other attacks may be provided by messaging between a client and a web service using a message-level security scheme that uses web service tokens (e.g., JavaScript Object Notation (JSON) web tokens (JWTs)) that are signed and encrypted according to private/public key pairs that are established in an initial TLS (or SSL) connection that establishes a bilateral root of trust. The web service tokens can be used for communications after the initial transport layer secured connection is closed, thus eliminating the need for establishing a new TLS connection for each communication session between the client and the server. The keys for the generating the web service tokens can be terminated by expiration in relation to a payload included therein and/or can be terminated by the client or web service.

This approach can be particularly advantageous in applications in which communications sessions between the client and the web service occur sporadically. As explained herein, for example, such techniques may be advantageously used in communications between a firmware manager client and a web service provided by a tower gateway base station (TGB) that serves a plurality of meters or other sensing devices. This approach can reduce overhead for such communications, can reduce the likelihood that credentials for accessing the web service may be intercepted, and also can allow both the client and the web service to initiate communications due to the bilateral nature of the trust relationship.

FIG. 1 illustrates a network environment in which embodiments of the inventive subject matter may be employed. A client 112 resident at a client device 110 (e.g., a computer, mobile terminal or other device) is configured to communicate with a web service 122 resident at a server 120 (e.g., a computer, base station, or other device) via a network 130. The client 112 and the web service 122 are configured to provide a message-level secured communications functions 114 and 124 that provide message-level security that obviates the need for repeated creation of TLS/SSL sessions.

Figure 2:
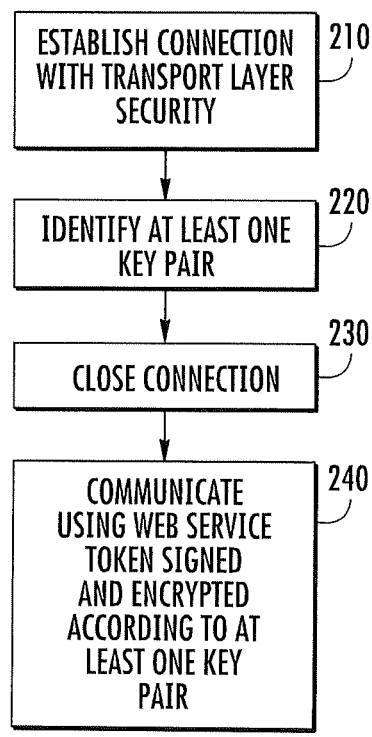
FIG. 2 is a flowchart illustrating operations for secure communications according to some embodiments of the inventive subject matter.

In particular, referring to FIG. 2, a connection with transport layer security (TLS) is established between the client 112 and the web service 122 via the network 130 (block 210). While the connection is present, at least one key pair for subsequent communication between the client 112 and the web service 122 are identified (block 220). After the connection is closed (block 230), the client 112 and the web service 122 can continue to communicate with one another using web service tokens that are signed and encrypted according to the at least one key pair (block 240). This allows the communications to occur without the need to re-establish a new transport layer secured connection.

Figure 3:
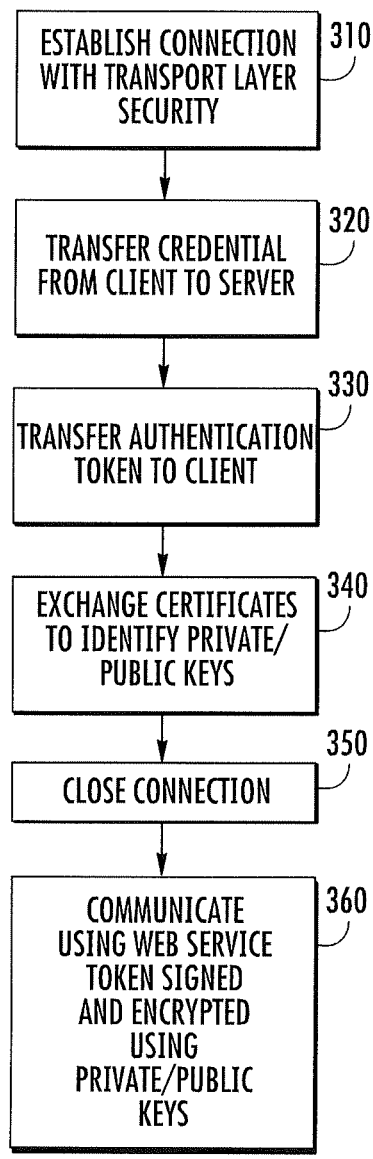
FIG. 3 is a flowchart illustrating operations for secure communications according to further embodiments.

FIG. 3 illustrates operations according to further embodiments. A TLS connection is established between a client and a web service using any of a number of known techniques (block 310). To initiate establishment of a bilateral root of trust, the client transfers a credential (e.g., a username/password) to the web service (block 320). In response, the web service authenticates the credential and returns an authentication token to the client (block 330). Using the authentication token, the client and server exchange security certificates and identify public/private keys (block 340). The TLS connection is then terminated (block 350). Subsequently, the client and server communicate using web service tokens that are signed and encrypted using the identified public/private key pairs (block 360). The web service token key pairs may be subsequently be invalidated unilaterally by the web service and/or responsive to, for example, expiration of a predetermined validity period or a request from the client.

As noted above, communications operations along the lines described above may be advantageously used in applications in which client and web service communicate on a sporadic basis. For example, referring to FIG. 1, a smart grid or other utility monitoring system may employ multiple smart devices, such as meters 440 and sensors 450, which are linked to a tower gateway base station (TGB) 430 via radio links. The TGB 430 may be linked via a network 420 to a firmware manager client 412 resident at a remote device 410. The firmware manager client 412 may be configured to update firmware on TGB 430 via communication with one or more web services 432 resident at the TGB 430 that gather data from the meters 440 and sensors 450.

Figure 5:
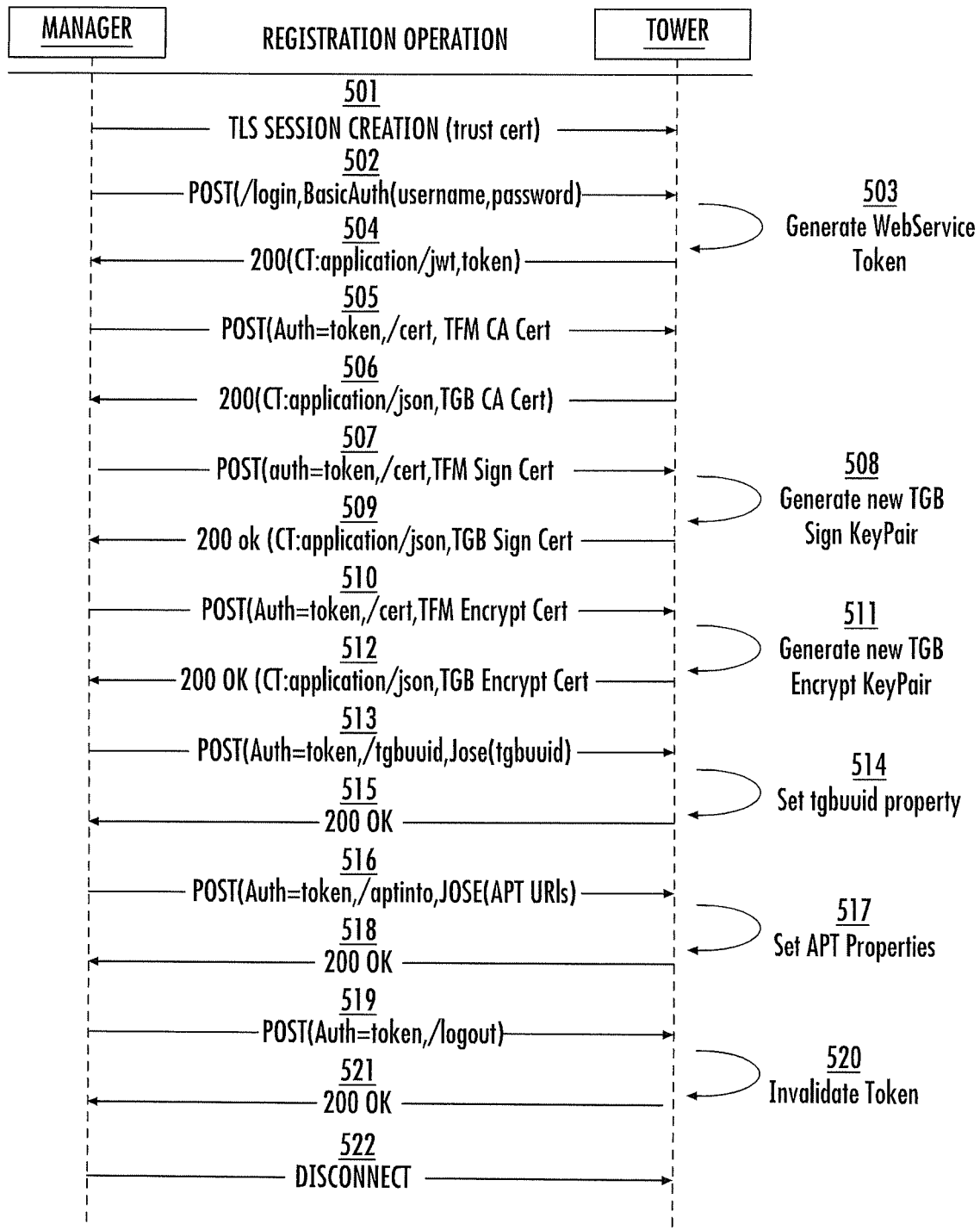
FIG. 5 is a message flow diagram illustrating registration operations in the system of FIG. 4.

FIG. 5 illustrates a representative message flow for registration between such a manager client and TGB web service according to further embodiments. After initiation of a TLS session (501), the manager transmits a login request, including username and password credentials (502). After verifying the credentials, the web service generates a JavaScript Object Notation (JSON) web service token (JWT) for use during an authentication process (503), and transmits the token to the manager (504). The manager and the web service exchange security certificates using the authentication JWT and responsively identify private/public key pairs for the manager and the server (505-512). The manager then assigns the TGB web service a unique ID, which the TGB web service saves and acknowledges (513-515). This is followed by the manager sending URLs that the TGB web service can use to download firmware packages, which the TGB web service saves and acknowledges (516-518). The manager subsequently transmits a request for the token to be invalidated (519), and the web service responsively invalidates the token and indicates the invalidation to the manager (520 and 521). The TLS connection may then be terminated (522).

After this registration process, communications between the client and the web service may then be conducted using the private/public key pairs identified during the TLS session. In particular, the client may initiate such communications by transmitting a JWT that is signed according to its private key, e.g., using a JSON Web Signing (JWS) compact serialization format as defined in IETF RFC 7515, and encrypted according to the server's public key, e.g., using a JSON Web Encryption (JWE) compact serialization format as defined in IETF RFC 7516. The server can decrypt such a token using its private key and verify that the signature of the token corresponds to the client. Similarly, the server can initiate communications by transmitting a JWT that is signed according to its private key and encrypted according to the client's public key.

Figure 4:
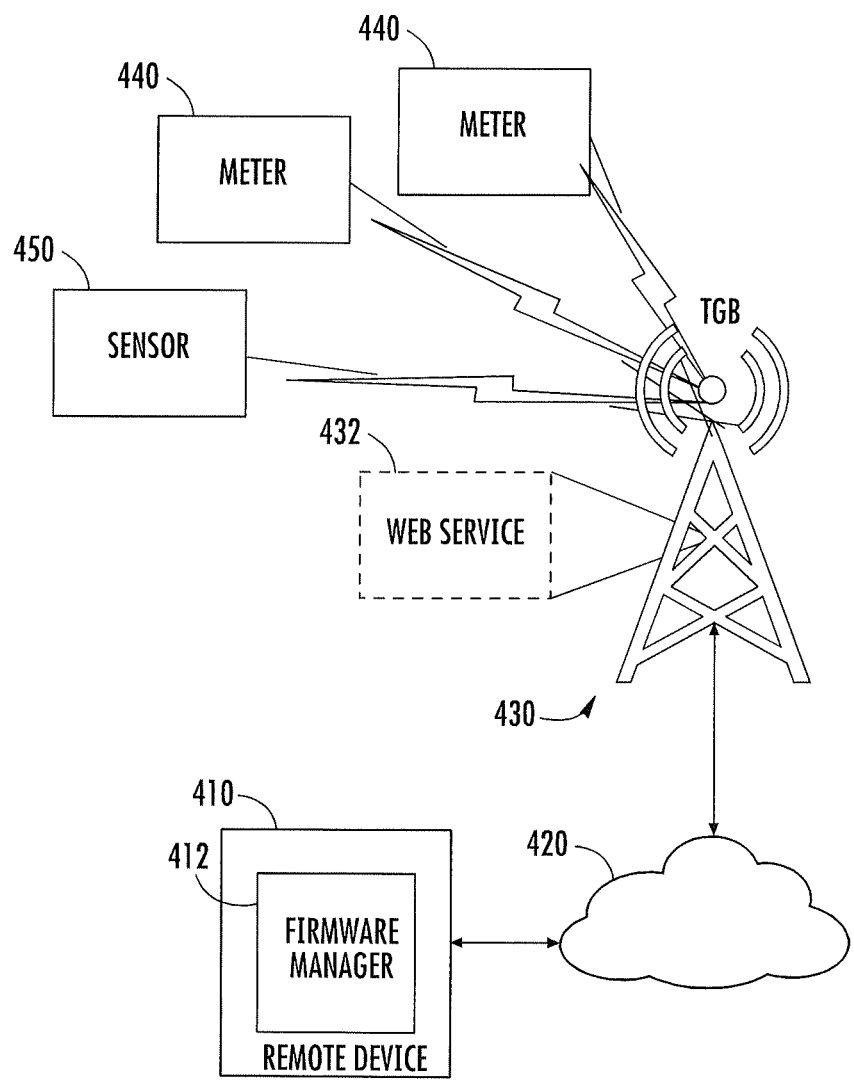
FIG. 4 is a schematic diagram illustrating a client-server system in which embodiments of the inventive subject matter may be employed.
Figure 6:
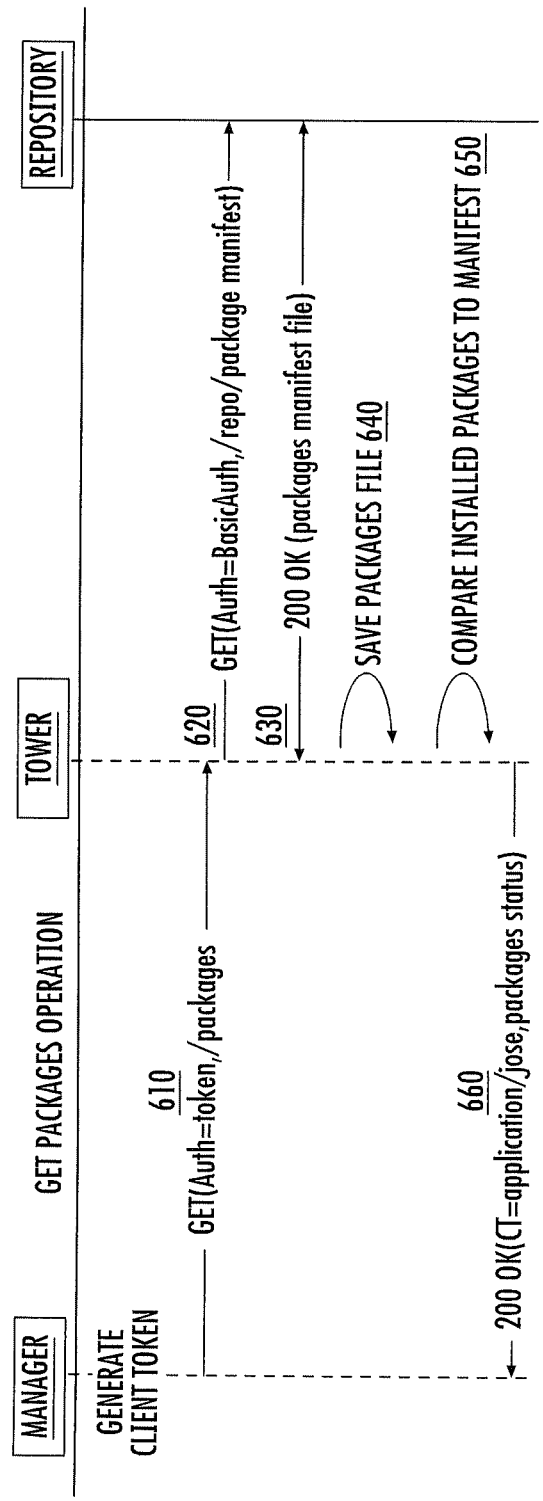
FIG. 6 is a message flow diagram illustrating firmware update operations for the system of FIG. 4.

For example, FIG. 6 illustrates operations for monitoring the configuration of software resident at a tower in the system of FIG. 4. The manager transmits a message that instructs the TGB to refresh its copy of a manifest of software packages from a software repository ("Repository" in FIG. 6) that possesses the desired (up to date) manifest (610). The transmission creates a JWT using the previously established key pairs, thus obviating the need for login. The location of the repository may be previously transmitted from the manager to the TGB in a message that includes the location (e.g., URL) of the repository and credentials needed to access the repository. The TGB transmits a request for the manifest to the repository using the previously established location and credentials (620), and receives a manifest file from the repository (630). The TGB saves the manifest file compares it to the currently installed packages at the TGB (640 and 650). The TGB reports the result to the manager (660).

Figure 7:
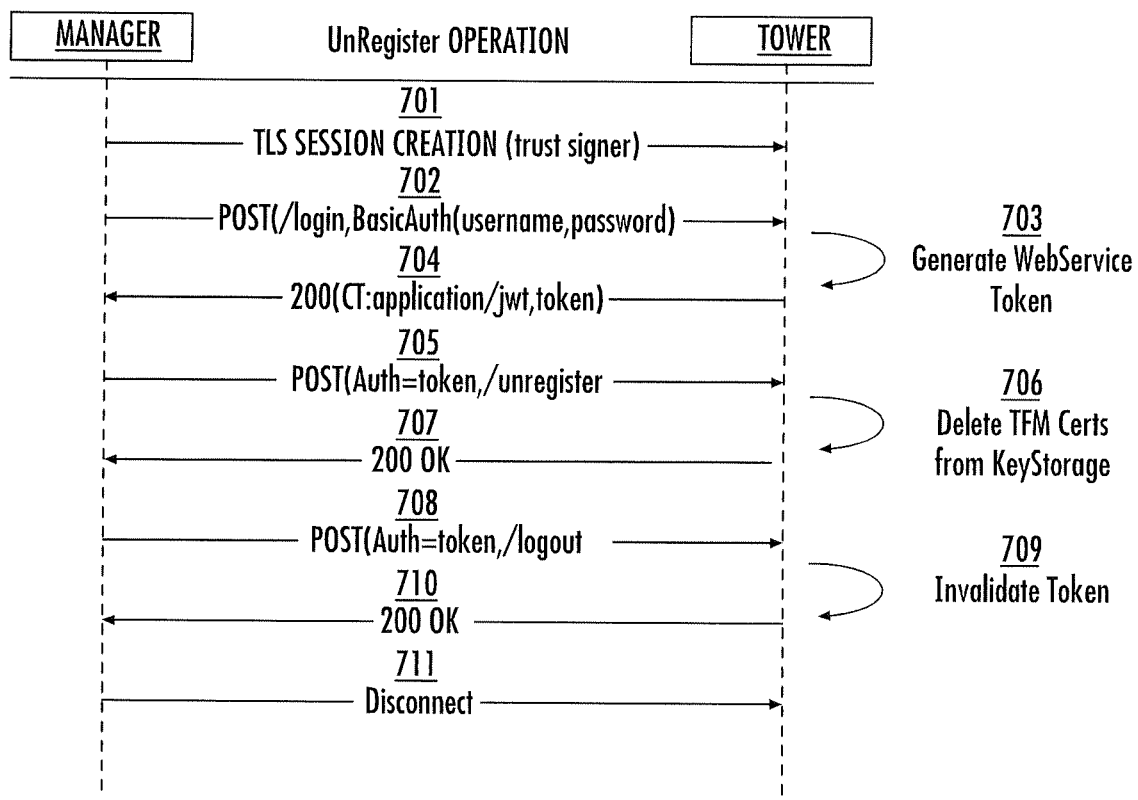
FIG. 7 is a message flow diagram illustrating de-registration operations in the system of FIG. 4.

FIG. 7 illustrates operations for unregistering according to further embodiments. Along lines described above, a TLS session is created between the manager and the TGB (701). The manager transmits a login request including a username/password combination (702), and the TGB generates and transmits a JWT that is used to generate key pairs for use in subsequent messaging (703 and 704). Subsequently (e.g., after one or more message exchanges), the manager may transmit an "unregister" request message (705). In response, the TGB deletes the public keys associated with the JWT for the request (706), and acknowledges the unregistration request (707). The manager may then transmit a logout request (708), and the TGB responsive invalidates the token (invalidates the keys). Subsequent token-enabled communications between the manager and the tower will require re-establishment of a bilateral root of trust as explained above with reference to FIG. 5.

It will be appreciated that the implementation described above with reference to FIGS. 4-7 is provided for purposes of illustration only, and that the inventive subject matter may be implemented in any of a number of different applications.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A method of operating a client, the method comprising:
establishing a secured transport layer security connection with a server that provides a web service;
transmitting a credential for the client to the server;
receiving a first web service token for the web service corresponding to the credential from the web service;
exchanging security certificates with the web service using the first web service token to identify at least one cryptographic key;
closing the secured transport layer security connection; and
communicating data with the web service using a second web service token that is created, signed and encrypted by a one of the client and the web service that is transmitting the data according to the identified at least one cryptographic key to communicate the data between the client and the server without retransmitting the credential to the server to create a new transport layer security connection.

2. The method of claim 1, wherein identifying at least one cryptographic key comprises identifying a client private key and a server public key and wherein communicating with the server using the second web service token comprises transmitting a web service token signed according to the client private key and encrypted according to the server public key.

3. The method of claim 1, wherein identifying at least one cryptographic key comprises identifying a client public key and a server private key and wherein communicating with the server using the second web service token comprises receiving a web service token signed according to the server private key and encrypted according to the client public key.

4. The method of claim 1, wherein the second web service token comprises a signed and encrypted JavaScript Object Notation (JSON) web service token (JWT).

5. The method of claim 4, wherein the JWT uses a JSON Web Signing (JWS) format and a JSON web encryption (JWE) format.

6. A computer configured to perform the method of claim 1.

7. A non-transitory computer-readable medium storing instructions that, when executed by a computer, perform the method of claim 1.

8. A method of operating a server, the method comprising:
establishing a secured transport layer security connection with a client;
receiving a credential;
transmitting a first web service token for the web service corresponding to the credential;
exchanging security certificates with the client using the first web service token to identify at least one cryptographic key;
closing the transport layer security connection; and
communicating data with the client using a second web service token that is created, signed and encrypted by a one of the client and the web service that is transmitting the data according to the identified at least one cryptographic key to communicate the data between the client and the server without again receiving the credential at the server to create a new transport layer security connection.

9. The method of claim 8, wherein identifying at least one cryptographic key comprises identifying a server public key and a client private key and wherein communicating with the server using the second web service token comprises receiving a web service token signed according to the client private key and encrypted according to the server public key.

10. The method of claim 8, wherein identifying at least one cryptographic key comprises identifying a server private key and a client public key and wherein communicating with the server using the second web service token comprises transmitting a web service token signed according to the server private key and encrypted according to the client public key.

11. The method of claim 8, wherein the second web service token comprises a signed and encrypted JavaScript Object Notation (JSON) web service token (JWT).

12. The method of claim 11, wherein the JWT uses a JSON Web Signing (JWS) format and a JSON web encryption (JWE) format.

13. A computer configured to perform the method of claim 8.

14. A non-transitory computer-readable medium storing instructions that, when executed by a computer, perform the method of claim 10.

15. A method of communicating between a client and a web service, the method comprising:
establishing a secured transport layer security connection between the client and a server that provides the web service;
transmitting a credential from the client to the server;
transmitting a first web service token for the web service corresponding to the credential from the web service to the client;
exchanging security certificates between the client and the web service using the first web service token to identify at least one cryptographic key;
closing the secured transport layer security connection; and
communicating data between the client and the web service using a second web service token that is created, signed and encrypted by a one of the client and the web service that is transmitting the data according to the identified at least one cryptographic key to communicate the data between the client and the server without again transmitting the credential at the server to create a new transport layer security connection.

* * * * *